United States Patent [19]
Kim et al.

[11] Patent Number: 6,028,021
[45] Date of Patent: Feb. 22, 2000

[54] MICROWAVE DIELECTRIC COMPOSITION AND METHOD FOR PREPARING THE SAME

[75] Inventors: Ho Gi Kim; Yung Park, both of Seoul; Tae Suk Chung, Kyunggido, all of Rep. of Korea

[73] Assignee: Korea Advanced Institute of Science and Technology, Taejeon, Rep. of Korea

[21] Appl. No.: 09/107,252

[22] Filed: Jun. 30, 1998

[30] Foreign Application Priority Data

Jul. 3, 1997 [KR] Rep. of Korea ............ 97-30876

[51] Int. Cl.⁷ .................................. C04B 35/48
[52] U.S. Cl. .................. 501/135; 501/134; 264/661; 264/681
[58] Field of Search .................... 501/134, 135; 264/661, 681

[56] References Cited

U.S. PATENT DOCUMENTS

| | | | |
|---|---|---|---|
| 4,550,088 | 10/1985 | Park et al. | 501/135 |
| 4,992,398 | 2/1991 | Huang et al. | 501/135 |
| 5,219,809 | 6/1993 | Kato et al. | 501/135 |
| 5,756,412 | 5/1998 | Lee et al. | 501/135 |

OTHER PUBLICATIONS

Kato et al., "Dielectric Properties of Lead Alkaline–Earth Zirconate at Microwave Frequencies," Japanese Journal of Applied Physics, vol. 30, No. 9B (1991), pp. 2343–2346 No Month.

Kato et al., "Crystal Structure Refinement of $(Pb_{1-x}Ca_x)ZrO_3$ by the Rietvelt Method," Japanese Journal of Applied Physics, vol. 32, No. 9B (1993), pp. 4356–4359 No Month.

*Primary Examiner*—Karl Group
*Attorney, Agent, or Firm*—Hickman Stephens Coleman & Hughes, LLP

[57] ABSTRACT

A microwave dielectric composition superior in all dielectric constant, product of resonant frequency by quality coefficient and temperature-dependent coefficient of resonant frequency, can be prepared by mixing a main oxide formulation consisting of lead oxide, calcium oxide, zirconium oxide and tin oxide with manganous nitrate $(Mn(NO_3)_2 \cdot 4H_2O)$, calcining the mixture at a temperature of about 1,000 to 1,200° C., pulverizing and molding the mixture, and sintering the molded body at a temperature of about 1,200 to 1,550° C. in an oxygen atmosphere. It is 100 or greater in dielectric constant, 4,000 or greater in the product of resonant frequency by quality coefficient and ±3 mmp/° C. or less in temperature-dependent coefficient of resonant frequency.

3 Claims, No Drawings

MICROWAVE DIELECTRIC COMPOSITION AND METHOD FOR PREPARING THE SAME

BACKGROUND OF THE INVENTION

1. Field of the invention

The present invention relates to a microwave dielectric composition and a preparing method therefor. More particularly, the present invention relates to a microwave dielectric composition superior in all dielectric constant, product of resonant frequency by quality coefficient and temperature-dependent coefficient of resonant frequency. Also, the present invention is concerned with a method for preparing such a microwave dielectric composition.

2. Description of the Prior Art

Today, various microwave dielectric compositions are used in high frequency integrated circuits or dielectric resonators. In addition, the exploitation for ever higher frequency in high frequency band has been continuous. Together with the availability of high frequency, the tendency toward simpleness, thinness, shortness and smallness in electromagnetic appliances, has made the demand for the microwave dielectric composition which is more improved in dielectric constant and quality coefficient.

To meet the demand, J. Kato et al. developed a microwave dielectric composition comprising lead oxide (PbO), calcium oxide (CaO) and zirconium oxide ($ZrO_2$) through an oxide mixing technique, as reported in Jpn. J. Appl. Phsy. 30(9B) 2343(1991) and 32(9B) 4356(1993). The compositions are found to be superior in individual dielectric constant, temperature coefficient of resonant frequency and the product of quality coefficient by resonant frequency but not in all of the properties. Accordingly, the compositions of J. Kato et al. are not suitable for use in microwave dielectric appliances, in practice.

SUMMARY OF THE INVENTION

It is, therefore, an object of the present invention to overcome the above problems encountered in prior arts and to provide a microwave dielectric composition superior in all dielectric constant, product of resonant frequency by quality coefficient and temperature-dependent coefficient of resonant frequency.

It is another object of the present invention to provide a method for preparing such a micrwave dielectric composition.

In accordance with an aspect of the present invention, there is provided a microwave dielectric composition comprising the oxides of lead (Pb), calcium (Ca), zirconium (Zr) and tin (Sn) in combination of an oxide of manganese (Mn).

In accordance with another aspect of the present invention, there is provided a method for preparing a microwave dielectric composition, in which a main oxide formulation consisting of lead oxide, calcium oxide, zirconium oxide and tin oxide is mixed with manganous nitrate ($Mn(NO_3)_2 \cdot 4H_2O$), calcined at a temperature of approximately 1,000 to 1,200° C., pulverized and molded, and sintered at a temperature of approximately 1,200 to 1,550° C. in an oxygen atmosphere.

DETAILED DESCRIPTION OF THE INVENTION

The microwave dielectric composition of the present invention is based on $(Pb_{1-x}Ca_x)(Zr_{1-y}Sn_y)O_3$ wherein x and y each represent a mole fraction, in combination with water-soluble manganous nitrate ($Mn(NO_3)_2 \cdot 4H_2O$). In more detail, manganese oxide (MnO) is added in the form of hydrous manganous nitrate ($Mn(NO_3)_2 \cdot 4H_2O$) at an amount less than 3% by weight on the basis of 100 parts by weight of the main composition comprising lead oxide (PbO), calcium oxide (CaO), zirconium oxide ($ZrO_2$) and tin oxide ($SnO_2$) when reduced into the weight of the oxides.

It is preferred that x is between 0.15 and 0.40. For example, if x is below 0.1, the resulting microwave dielectric composition has a low product of quality coefficient by resonant frequency. On the other hand, if x exceeds 0.40, the microwave dielectric composition is improved in the product of quality coefficient by resonant frequency, but poor in dielectric constant.

As for y, it is preferable to be between 0.15 and 0.50. For example, if y is below 0.15, the resulting microwave dielectric composition has a temperature-dependent coefficient of resonant frequency less than −10 mmp/° C. On the other hand, if y is over 0.5, the temperature-dependent coefficient of resonant frequency increases to +10 mmp/° C. or greater.

The amount of the additive element MnO is very important to the properties of the microwave dielectric composition. For example, when the additive element is present at an amount exceeding the allowable range, the resulting microwave dielectric composition is deteriorated in sintering property and quality coefficient.

In accordance with the present invention, the precise adjustment of the additive element can be possible by taking advantage of hydrous manganous nitrate ($Mn(NO_3)_2 \cdot 4H_2O$).

When a composition comprising 0.65 mol of lead oxide (PbO), 0.35 mol of calcium oxide (CaO), 0.79 mol of zirconium oxide ($ZrO_2$), 0.21 mol of tin oxide ($SnO_2$), and 0.5% by weight of hydrous mianganous nitrate ($Mn(NO_3)_2 \cdot 4H_2O$), is sintered at a temperature of 1,350° C., a superior microwave dielectric composition can be obtained which is 130 or greater in dielectric constant at 5 GHz, 500 in the product of quality coefficient by resonant frequency, and 1 mmp/° C. in temperature-dependent coefficient of resonant frequency.

A better understanding of the present invention may be obtained in light of the following examples which are set forth to illustrate, but are not to be construed to limit, the present invention.

EXAMPLES 1 TO 8 & COMPARATIVE EXAMPLES 1 TO 4

Main compositions consisting of lead oxide (PbO), calcium oxide (CaO), zirconium oxide ($ZrO_2$) and tin oxide ($SnO_2$), each being 99% or higher in purity, and manganous nitrate ($Mn(NO_3)_2 \cdot 4H_2O$) were weighed as indicated in the following Table 1. Thereafter, they were mixed by using a nylon jar and zirconium oxide balls for 2 hours in a planetary mill. At that moment, distilled water was used as a dispersing medium. The slurries thus obtained were dried before calcination at a temperature of approximately 1,000 to 1,200° C. according to their compositions and then, pulverized into powders with appropriate sizes.

The powders were molded to specimens with a diameter of 8.0 mm and a thickness of 3.5 mm by dry-pressing under 1 MPa.

In an oxygen atmosphere, the specimens were sintered at a temperature of approximately, 1,200 to 1,550° C. Unless the specimens were sintered in an oxygen atmosphere, their quality coefficients were poor.

The additive water-soluble manganous nitrate ($Mn(NO_3)_2 \cdot 4H_2O$) was advantageous in that it can be homogeneously diffused throughout the powders during the calcination or sintering.

TABLE 1

Properties of Microwave Dielectric Compositions

| Examp. Nos. | Main Comp. (mol) $Pb_{1-x}Ca_xZr_{1-y}Sn_yO_3$ | | Addi. MnO* (wt %) | Sinter Temp. (°C) | Dielec. Const at 5 GHz (K) | Qxf | $\tau_f$ (ppm/°C) |
|---|---|---|---|---|---|---|---|
| | x | y | | | | | |
| 1 | 0.29 | 0.30 | 1.0 | 1300 | 120 | 4500 | 3 |
| 2 | 0.31 | 0.25 | 2.0 | 1350 | 110 | 4200 | 2 |
| 3 | 0.33 | 0.32 | 1.5 | 1320 | 105 | 4700 | −1 |
| 4 | 0.30 | 0.40 | 2.0 | 1280 | 103 | 5500 | 0 |
| 5 | 0.30 | 0.35 | 1.3 | 1300 | 125 | 5200 | 4 |
| 6 | 0.25 | 0.40 | 1.0 | 1200 | 110 | 8000 | −2.5 |
| 7 | 0.35 | 0.21 | 0.5 | 1350 | 130 | 5300 | 1 |
| 8 | 0.18 | 0.42 | 0.1 | 1400 | 140 | 5200 | 1 |
| C.1 | 0.10 | 0.10 | . | 1300 | unable to be sintered | | |
| C.2 | 0.20 | 0.30 | . | 1320 | 120 | 2500 | 4 |
| C.3 | 0.30 | 0.60 | . | 1100 | 80 | 3000 | 20 |
| C.4 | 0.50 | 0.30 | 0.1 | 1400 | 70 | 2400 | 80 |

*added in the form of manganous nitrate ($Mn(NO_3).4H_2O$)

After being polished to have a smooth surface, the sintered specimens were measured for dielectric constant, quality coefficient and temperature-dependent coefficient of resonant frequency in an open cavity manner.

From the data of Table 1, it is apparent that the microwave dielectric composition of the present invention is 100 or greater in dielectric constant, 4,000 or greater in the product of resonant frequency by quality coefficient and ±3 mmp/° C. or less in temperature-dependent coefficient of resonant frequency.

As described hereinbefore, the microwave dielectric composition prepared according to the present invention is superior in all dielectric constant, product of resonant frequency by quality coefficient and temperature-dependent coefficient of resonant frequency on the account that the water-soluble additive manganous nitrate ($Mn(NO_3).4H_2O$) can be precisely added.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A microwave dielectric composition consisting essentially of the main composition of lead oxide (PbO), calcium oxide (CaO), zirconium oxide ($ZrO_2$) and tin oxide ($SnO_2$), expressed by the formula $(Pb_{1-x}Ca_x)(Zr_{1-y}Sn_y)O_3$, wherein x and y each represent a mole fraction under the condition of $0.15<x<0.40$ mol. and $0.15<y<0.50$ mol, and oxide of manganese as an additive wherein the amount of additive is less than 3% by weight on the basis of 100 parts by weight of a main composition.

2. A microwave dielectric composition, comprising the oxides of lead (Pb), calcium (Ca), zirconium (Zr), and tin (Sn), wherein said oxides are represented by the following formula:

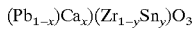

$(Pb_{1-x}Ca_x)(Zr_{1-y}Sn_y)O_3$ wherein x and y each represent a mole fraction under the condition of $0.15<x<0.40$ mol. and $0.15<y<0.50$ mol, in combination with an oxide of manganese (Mn).

3. A method for preparing a microwave dielectric composition, in which a main oxide formulation of lead oxide, calcium oxide, zirconium oxide and tin oxide expressed by the formula $(Pb_{1-x}Ca_x)(Zr_{1-y}Sn_y)O_3$, wherein x and y each represent a mole fraction under the condition of $0.15<x<0.40$ mol. and $0.15<y<0.50$, is mixed with manganous nitrate($Mn(NO_3)_2.4H_2O$), calcined at a temperature of approximately 1,000 to 1,200° C., pulverized and molded, and sintered at a temperature of approximately 1,200 to 1,550° C. in an oxygen atmosphere.

* * * * *